US012252358B2

(12) United States Patent
Ikeuchi

(10) Patent No.: US 12,252,358 B2
(45) Date of Patent: Mar. 18, 2025

(54) CAPSULE MASS MEASURING DEVICE

(71) Applicant: QUALICAPS CO., LTD., Yamatokoriyama (JP)

(72) Inventor: Kyosuke Ikeuchi, Yamatokoriyama (JP)

(73) Assignee: QUALICAPS CO., LTD., Yamatokoriyama (JP)

( * ) Notice: Subject to any disclaimer, the term of this patent is extended or adjusted under 35 U.S.C. 154(b) by 166 days.

(21) Appl. No.: 17/906,401

(22) PCT Filed: Mar. 11, 2021

(86) PCT No.: PCT/JP2021/009711
§ 371 (c)(1),
(2) Date: Sep. 15, 2022

(87) PCT Pub. No.: WO2021/193080
PCT Pub. Date: Sep. 30, 2021

(65) Prior Publication Data
US 2023/0174327 A1 Jun. 8, 2023

(30) Foreign Application Priority Data

Mar. 23, 2020 (JP) ................................. 2020-050712

(51) Int. Cl.
*B65G 65/48* (2006.01)
*B65G 47/14* (2006.01)
*B65G 47/84* (2006.01)

(52) U.S. Cl.
CPC ..... *B65G 65/4881* (2013.01); *B65G 47/1407* (2013.01); *B65G 47/846* (2013.01);
(Continued)

(58) Field of Classification Search
CPC ............ B65G 65/4881; B65G 47/1407; B65G 47/846; B65G 2201/027;
(Continued)

(56) References Cited

U.S. PATENT DOCUMENTS 10,502,612 B2 * 12/2019 Kiehn .................... G01G 17/00
2003/0019797 A1 * 1/2003 Yamamoto .............. A61J 3/074
209/649

FOREIGN PATENT DOCUMENTS

CA 2983547 A1 * 6/2018 .............. A61J 3/074
EP 0685714 A1 * 12/1995
(Continued)

*Primary Examiner* — Gene O Crawford
*Assistant Examiner* — Abby A Jorgensen
(74) *Attorney, Agent, or Firm* — Muncy, Geissler, Olds & Lowe, P.C.

(57) ABSTRACT

A capsule mass measuring device includes conveyer roller and measurement device having measurement plate. Conveyer roller is provided with protrusions and accommodation parts formed between adjacent protrusions, and each of which accommodating the capsule such that a longitudinal direction of the capsule is arranged along rotation axis. Measurement plate is provided with groove part and the measurement plate is arranged such that the capsule in accommodation part is supplied to groove part, by a rotation of the conveyer roller, during a period after the capsule passes through the lowest point until rotating 45 degrees, and the capsule of which the mass has been measured is discharged from measurement plate by contacting one of protrusions, which is defined as one protrusion, due to the rotation of conveyer roller.

4 Claims, 2 Drawing Sheets

(52) U.S. Cl.
CPC ............... *B65G 2201/027* (2013.01); *B65G 2203/0258* (2013.01); *B65G 2203/042* (2013.01)

(58) Field of Classification Search
CPC ....... B65G 2203/0258; B65G 2203/042; A61J 3/074; G01G 13/026; G01G 17/00; G01G 21/22
See application file for complete search history.

(56) References Cited

FOREIGN PATENT DOCUMENTS

| JP | H10305260 A | * | 11/1998 | |
|---|---|---|---|---|
| JP | 2016-135714 A | | 7/2016 | |
| WO | WO-9731244 A1 | * | 8/1997 | ............. G01G 17/00 |
| WO | WO-03050020 A1 | * | 6/2003 | ............. B65B 21/06 |
| WO | WO-2012023118 A1 | * | 2/2012 | ............. A61J 3/074 |
| WO | WO-2013046105 A1 | * | 4/2013 | ............. B65G 29/00 |

* cited by examiner

CAPSULE MASS MEASURING DEVICE

TECHNICAL FIELD

The present invention relates to a capsule mass measuring device.

BACKGROUND

Patent Document 1 discloses the following configuration as an apparatus for mass inspection of capsules, which including a receiving roller that accommodates and conveys tablets/formulations such as capsules supplied from a conveying roller in a pocket, and a measurement device that measures the mass of the capsule conveyed by the receiving roller. The measuring device includes a measurement plate that receives the capsule(s) contained in the pocket(s) of the receiving rollers, and an injection device that injects compressed gas into the measurement plate. The capsule placed on the measurement plate is discharged to the outside by gas injection from the injection device after the weight of the capsule(s) is measured.

RELATED PRIOR ART

Patent Doc(s)

[Patent Doc. 1] JP laid-open patent application publication 2016-135714

SUMMARY

Problems to be Solved by the Invention

The above measuring device requires an injection device for discharging the capsule from the measurement plate. Therefore, there was a possibility that the configuration becomes complicated. Also, there was a room for further improvement from a viewpoint of mass measuring of the capsule at high speed.

An objective of the present invention is to provide a capsule mass measurement device that quickly and surely measures the mass of capsule with a simple configuration.

Means to Solve the Problem(s)

The objective of the present invention is achieved by a capsule mass measuring device, comprising: a conveyer roller that conveys a capsule wherein the conveyer roller is intermittently driven, and a measurement device that measures a mass of the capsule supplied to a measurement plate by the conveyer roller, wherein the conveyer roller is provided with a plurality of protrusions that radially outwardly protrude from a cylindrical main body having a horizontal rotation axis, and a plurality of accommodation parts that are formed between the adjacent protrusions, and each of which accommodating the capsule such that a longitudinal direction of the capsule is arranged along the rotation axis, the measurement plate is provided with a groove part having a V-shaped cross section to hold both sides of the capsule in a width direction of the capsule, and the measurement plate is arranged such that the capsule accommodated in the accommodation part is supplied to the groove part, by a rotation of the conveyer roller, during a period after the capsule passes through the lowest point until rotating 45 degrees, and the capsule of which the mass has been measured is discharged from the measurement plate by contacting one of the protrusions, which is defined as one protrusion, due to the rotation of the conveyer roller.

In the capsule mass measuring device, it is preferred that a notch is formed on at least one side of the groove part of the measurement plate in a width direction of the groove part, wherein a tip of the one protrusion passes through the notch. It is also preferred that the one protrusion is formed to have a width that is shorter than a longitudinal length of the capsule.

It is preferred that the V-shaped cross section of the groove part has an angle of V-shape that is ranged from 70 to 110 degrees.

It is preferred that the measurement plate is provided with a pair of holding parts that stand on both sides of the groove part in a longitudinal direction of the groove part.

Advantage(s) of the Present Invention

According to the capsule mass measuring device of the present invention, the capsule mass measuring is quickly and surely performed with a simple configuration.

BRIEF EXPLANATIONS OF THE DRAWINGS

EMBODIMENT(S) OF THE PRESENT INVENTION

Figure 1:
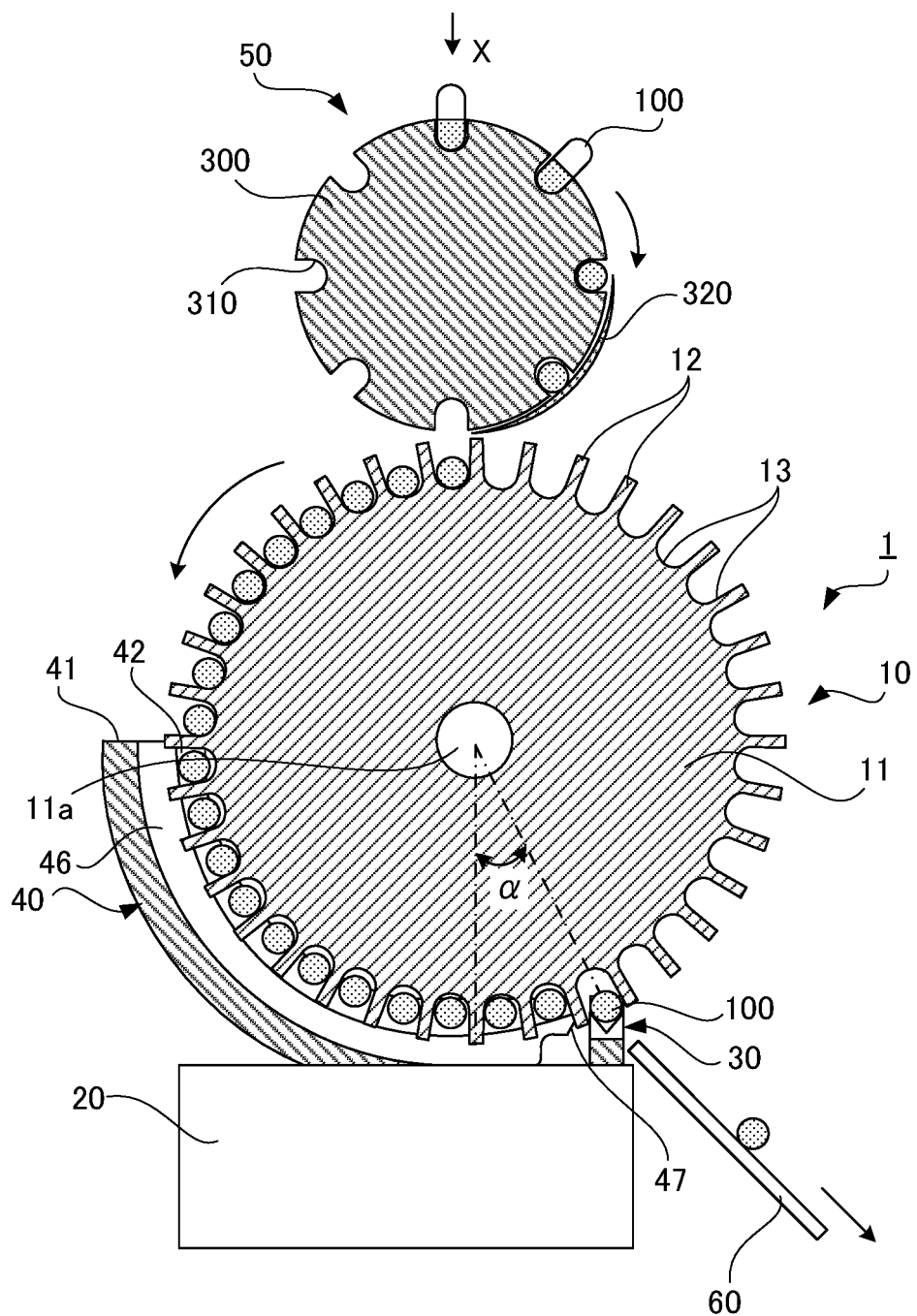
FIG. 1 is a schematic vertical sectional view of a capsule mass measuring device according to an embodiment of the present invention.

Hereinafter, embodiments of the present invention is explained with reference to the accompanying drawings. FIG. 1 is a schematic vertical sectional view of a mass measuring device of capsules (hereinafter, simply referred to as "mass measuring device") according to an embodiment of the present invention. As shown in FIG. 1, mass measuring device 1 is conveyer roller 10 that conveys capsules 100 supplied from supply device 50, which is intermittently driven, and measurement device 20 that measures the mass of capsule(s) 100 conveyed by conveyer roller 10. Capsules 100 are hard capsules with a body and a cap. Powdery, liquid, chemicals or foods, etc. can be stored by fitting the cap on the body. Capsules 100 may be in a state in which a content is contained or in an empty state in which no contents is contained.

Conveyer roller 10 includes main body part 11, a plurality of protrusion parts 12, and a plurality of accommodation parts 13. Main body part 11 has a cylindrical shape having horizontal rotation shaft 11a. Protrusion parts 12 protrude radially outward from main body part 11. Accommodation parts 13 are formed between the adjacent protrusion parts 12 to accommodate capsules 100. The distance between adjacent protrusions 12 is substantially the same as the diameter of capsules 100. The bottom part of accommodation part 13 is formed in arc shapes in their cross-sectional view, having substantially the same diameter as the diameter of capsules 100.

Supply device 50 includes direction regulation roller 300 that regulates the direction of capsule 100 supplied in the X direction indicated by the supply hopper (not shown). In direction regulating roller 300, a plurality of pockets 310 are formed at equal intervals along the circumferential direction of the outer peripheral surface. Capsules 100 are housed in each pocket 310 in an upright position from a supply hopper (not shown). A part of capsule 100 protrudes from the outer peripheral surface of direction regulating roller 300. One capsule 100 housed in pocket 310 comes into contact with direction regulating member 320 by intermittent driving of direction regulating roller 300 in the direction indicated by the arrow. Then, capsule 100 is supplied to accommodating part 13 of conveyer roller 10 after the direction is regulated so as to be in the sideways state in pocket 310. When capsule 100 is supplied from the supply hopper (not shown) to conveyer roller 40 in a manner such that capsule 100 is laid down sideways, direction regulating roller 300 can be omitted.

Figure 2:
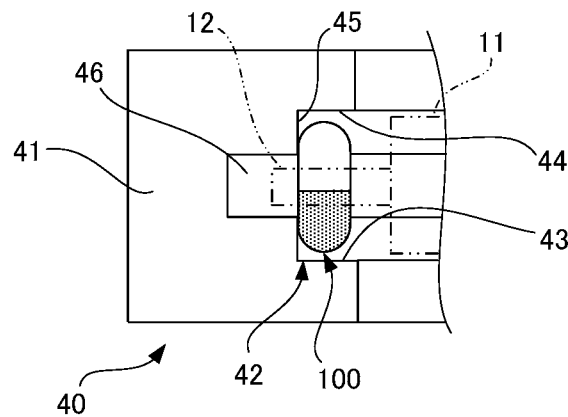
FIG. 2 is a plan view showing a main part of the capsule mass measuring device shown in FIG. 1.

Capsule 100 accommodated in accommodation part 13 is conveyed along guide member 40 that is an arc-shaped in the direction indicated by the arrow, and is supplied to measurement device 20. FIG. 2 is a plan view showing the vicinity of one end part 41 of guide member 40. As shown in FIGS. 1 and 2, guide member 40 is arranged so that one end part 41 is substantially horizontal at a position that is substantially the same height as the center of conveyer roller 10. Guide member 40 is formed with conveyer recess part(s) 42, which is a notch-shaped, on the inner peripheral side of the arc shape. Conveyer recess part 42 guides capsule 100 along bottom wall 45 between a pair of side walls 43, 44. Notch-shaped relief part 46 is formed in the central part of bottom wall 45 along the conveyer direction of capsule 100. Due to the tip of protrusion parts 12 of conveyer roller 11 indicated by the double-dotted line moving along relief part 46, capsule 100 is pressed by protrusion part 12 and conveyed inside conveyer recess part 42.

Measurement device 20 includes measurement plate 30 attached to a plate mounting part, which is built in measuring mechanism. Measurement device 20 measures a mass of one capsule 100 placed on measurement plate 30. As shown in FIG. 1, measurement plate 30 is arranged in the vicinity of other end part 47 of guide member 40. As a result, capsule 100, which is accommodated in accommodating part 13 of conveyer roller 10 that rotates around horizontal rotating shaft 11a, is supplied to measurement plate 30 during a period after the capsule passes through the lowest point until it rotates 45 degrees around rotating shaft 11a. Namely, the guide member 40 is arranged in the vicinity of the other end part 47. That is, an angle α that is formed between the straight line, which connects the center of conveyer roller 10 and the center of the capsule supplied to measurement plate 30, and the vertical direction is set to be larger than 0 degrees and smaller than 45 degrees. This angle α is preferably ranged from 10 to 30 degrees.

Figure 3:
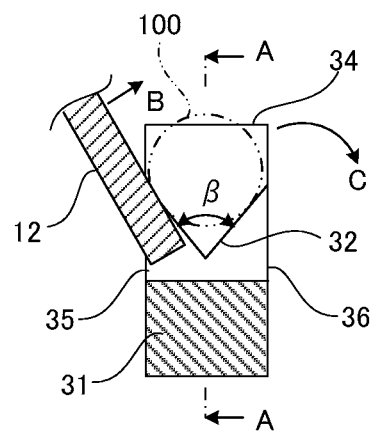
FIG. 3 is an enlarged view showing another main part of the capsule mass measuring device shown in FIG. 1.
Figure 4:
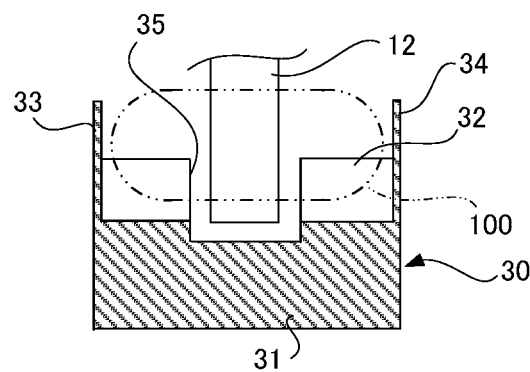
FIG. 4 is a cross-sectional view taken along the line A-A of FIG. 3.

FIG. 3 is an enlarged view of measurement plate 30 shown in FIG. 1. FIG. 4 is a cross-sectional view taken along the line A-A of FIG. 3. As shown in FIGS. 3 and 4, measurement plate 30 is formed with groove part 32 having a V-shaped cross section on the upper part of plate body 31 formed in a block shape. Both sides of supplied capsule 100 in the width direction are in contact with groove part 32, and capsule 100 is held by measuring plate 30. A pair of holding parts 33, 34 are provided upright on both sides of groove part 32 in the longitudinal direction. The end of capsule 100 in the longitudinal direction can come into contact with holding parts 33, 34. As a result, capsule 100 is securely held in groove part 32.

As shown in FIG. 3, notches 35 and 36 through which the tip of protrusion 12 intermittently driven in the arrow B direction passes are formed on both sides of groove part 32 in measurement plate 30 in the width direction. After the mass is measured, Capsule 100 of which the mass has been measured is scooped up by a contact with protrusion 12 that passed through notch 35. Thus, capsule 100 is ejected from groove part 32 as indicated by arrow C without being overloaded. As shown in FIG. 4, the width of protrusion 12 along the longitudinal direction of groove part 32 is formed to be shorter than the longitudinal length of supplied capsule 100. By contacting protrusion 12 to the central part of capsule 100 in the longitudinal direction, capsule 100 is reliably discharged from groove part 32.

The V-shaped angle β of groove part 32 shown in FIG. 3 is not necessarily limited. However, when capsule 100 is discharged, it is preferable for the angle β to be as small as possible within a range that does not cause an excessive load on capsule 100. As a result, the time until the capsule 100 supplied to groove part 32 becomes to rest is shortened. In addition, the mass of capsule 100 can be measured quickly. That is, if the above angle β is too large, the time until the capsule 100 supplied to groove part 32 becomes to rest and can be measured becomes long. On the other hand, if the angle β is too small, capsule 100 or measurement device 20 may be damaged due to an excessive load when capsule 100 is discharged. Therefore, in consideration of the above points, it is preferable to set the angle β within the range of 70 to 110 degrees. The angle β may be set in accordance with angle α discussed next. Specifically, it is preferable to set the angles α and β (degrees) so as to satisfy relationship of $$130 > \beta > 130 - 2\alpha.$$

In this case, it is more preferable that the angles α and β satisfy the above relationship, and further satisfy $$30 > \alpha > 10 \text{ and } 110 > \beta > 70.$$

Notches 35 and 36 of the present embodiment are formed on both sides of groove part 32 in the width direction. However, since protrusion 12 moves diagonally upward so as to scoop up capsule 100, notch 35 may be formed only on one side of groove part 32 in the width direction, which is the upstream side in the movement direction of protrusion 12.

If there is no risk of damaging capsule 100 or measurement device 20, without forming notches 35 and 36, by contacting the tip of protrusion 12 to a portion where capsule 100 is exposed above groove part 32, capsule 100 can also be discharged from groove part 32. The shape and size of protrusion 12 in the embodiment are not particularly limited. For example, partition walls that are provided between a plurality of accommodating parts configured of pockets formed along the circumferential direction on the outer peripheral surface of conveyer roller 10 can be used as the protrusions.

The configuration of supply device 50 shown in FIG. 1 is not particularly limited to the configuration disclosed in the present application. For example, as disclosed in Patent Document 1, by vacuum-sucking the capsules put into the hopper on the outer peripheral surface of the suction roller, the capsules might be supplied to conveyer roller 10. Alternatively, by providing an appearance inspection device for imaging the capsules conveyed by an appearance inspection roller with an imaging device, the capsules after the appearance inspection is done might be supplied from the appearance inspection roller to conveyer roller 10 via direction regulation roller 300.

Capsule 100 of which the mass has been measured by measurement device 20 is discharged to the outside along discharge chute 60. The above-mentioned appearance inspection device may be provided on the downstream side in the conveyer direction of measurement device 20. The appearance inspection may be performed by supplying the capsules discharged from measurement plate 30 to the appearance inspection roller.

EXPLANATIONS OF REFERENCES

1 Capsule mass measuring device
10 Conveyer roller
11 Main body
12 Protrusion
13 Accommodation part
20 Measurement Device
30 Measurement Plate
32 Groove part
33, 34 Holding parts
35, 36 Notches

What is claimed is:

1. A capsule mass measuring device, comprising:
a conveyer roller that conveys a capsule in a conveyance direction wherein the conveyer roller is intermittently driven, and
a measurement device that measures a mass of the capsule supplied to a measurement plate by the conveyer roller, wherein
the conveyer roller is provided with
a plurality of protrusions that radially outwardly protrude from a cylindrical main body having a horizontal rotation axis, and
a plurality of accommodation parts that are formed between the adjacent protrusions, and each of which accommodating the capsule such that a longitudinal direction of the capsule is arranged along the rotation axis,
the measurement plate is provided with a groove part having a V-shaped cross section to hold both sides of the capsule in a width direction of the capsule, wherein the width direction of the capsule is arranged along the conveyance direction, and
the measurement plate is arranged such that the capsule accommodated in the accommodation part is supplied to the groove part, by a rotation of the conveyer roller around the rotation axis of the conveyer roller, during a period after the capsule passes through the lowest point until the conveyer roller rotates 45 degrees,
the capsule of which the mass has been measured is discharged from the measurement plate by contacting one of the protrusions, which is defined as one protrusion, due to the rotation of the conveyer roller,
a notch is formed on at least one side of the groove part of the measurement plate in a width direction of the groove part, wherein a tip of the one protrusion passes through the notch,
the notch is formed to penetrate the at least one side of the groove part of the measurement plate in the width direction of the groove part,
the V-shaped cross section of the groove part is configured with two side faces and one valley ridge,
the side faces are connected at the ridge, and
the ridge is linear extending parallel to the rotation axis of the conveyer roller such that the longitudinal direction of the capsule rests in the groove part parallel to the rotation axis.

2. The capsule mass measuring device according to claim 1, wherein
the one protrusion is formed to have a width that is shorter than a longitudinal length of the capsule.

3. The capsule mass measuring device according to claim 1, wherein
the V-shaped cross section of the groove part has an angle of V-shape that is ranged from 70 to 110 degrees.

4. The capsule mass measuring device according to claim 1, wherein
the measurement plate is provided with a pair of holding parts that stand on both sides of the groove part in a longitudinal direction of the groove part.

\* \* \* \* \*